United States Patent [19]

Cattau

[11] Patent Number: 5,449,191
[45] Date of Patent: Sep. 12, 1995

[54] FIFTH WHEEL SLIDE ASSEMBLY

[76] Inventor: Lyle L. Cattau, P.O. Box 125, Leigh, Nebr. 68643

[21] Appl. No.: 298,848

[22] Filed: Aug. 31, 1994

Related U.S. Application Data

[63] Continuation of Ser. No. 126,916, Sep. 27, 1993.

[51] Int. Cl.$^6$ .............................................. B62D 53/08
[52] U.S. Cl. ................................ 280/438.1; 280/441; 280/407
[58] Field of Search ...................... 280/433, 438.1, 439, 280/441, 405.1, 407, 407.1

[56] References Cited

U.S. PATENT DOCUMENTS

| | | | |
|---|---|---|---|
| 2,985,463 | 5/1961 | Geerds | 280/407 |
| 3,729,214 | 4/1973 | Mulcahy et al. | 280/407 |
| 3,893,710 | 7/1975 | Madura | 280/407 |
| 3,963,259 | 6/1976 | Massey | 280/80 B |
| 4,429,892 | 2/1984 | Frampton et al. | 280/407 |
| 4,443,025 | 4/1984 | Martin et al. | 280/407 |
| 4,614,355 | 9/1986 | Koch | 280/438 R |
| 4,919,445 | 4/1990 | Robey | 280/149.2 |
| 5,044,651 | 9/1991 | Weikel | 280/407 |
| 5,344,173 | 9/1994 | Beeler et al. | 280/438.1 |

Primary Examiner—Eric D. Culbreth
Assistant Examiner—F. Zeender
Attorney, Agent, or Firm—Zarley, McKee, Thomte, Voorhees & Sease; Mark D. Frederiksen

[57] ABSTRACT

A fifth wheel slide assembly includes a deck plate mounted on the frame of a tractor, with a pair of toothed guide rails on the upper surface. A conventional fifth wheel with pedestal and hitch plate is selectively slidably movable along the toothed rails. A plurality of apertures are formed adjacent each toothed rail, and have freely rotatable rollers projecting therethrough for supporting a pair of flat support plates on the bottom of the fifth wheel pedestal. A pair of stops are mounted on the rearward end of the deck plate to prevent movement of the pedestal beyond the rearward end. The side edges of the deck plate include inwardly opening channels receiving outwardly projecting flanges on the pedestal, to prevent movement of the pedestal upwardly off of the deck plate.

2 Claims, 3 Drawing Sheets

5,449,191

FIFTH WHEEL SLIDE ASSEMBLY

CROSS-REFERENCE TO RELATED APPLICATION

This is a continuation application of Ser. No. 08/126,916 filed Sep. 27, 1993, now pending.

TECHNICAL FIELD

The present invention relates generally to a movable fifth wheel for semi-tractor/trailer combinations, and more particularly to a slide assembly for fifth wheels.

BACKGROUND OF THE INVENTION

Conventional fifth wheels on semi-tractors are provided with a coupler face mounted on a pedestal, with the pedestal slidably mounted on a deck for selected forward and rearward movement on the tractor frame. The adjustability of the fifth wheel pedestal permits the trailer to be mounted to the tractor so as to accurately locate the load over the axles of the tractor.

Because the fifth wheel is exposed to the environmental, dirt and grime quickly build on the fifth wheel, and particularly between the pedestal and deck, making the pedestal difficult to slide on the deck. Conventionally, the pedestal is shifted relative to the deck by hitching a trailer to the hitch plate and driving the tractor forward or rearward while the trailer holds the pedestal in position. In fact, the effects of weather on the sliding action can be so detrimental, that the tractor can damage its transmission attempting to shift the fifth wheel pedestal on the tractor frame.

SUMMARY OF THE INVENTION

It is therefore a general object of the present invention to provide an improved slide assembly for a fifth wheel.

Yet another object is to provide a fifth wheel slide assembly which will easily shift forwardly or rearwardly.

Still a further object is to provide a fifth wheel slide assembly which eliminates the majority of the effect of weather on the slidability of the pedestal relative to the deck.

Still another object is to provide a fifth wheel slide assembly which may be simply mounted to tractor frames of various dimensions.

These and other objects will be apparent to those skilled in the art.

The fifth wheel slide assembly of the present invention includes a deck plate mounted on the frame of a tractor, with a pair of toothed guide rails on the upper surface. A conventional fifth wheel with pedestal and hitch plate is selectively slidably movable along the toothed rails. A plurality of apertures are formed adjacent each toothed rail, and have freely rotatable rollers projecting therethrough for supporting a pair of flat support plates on the bottom of the fifth wheel pedestal. A pair of stops are mounted on the rearward end of the deck plate to prevent movement of the pedestal beyond the rearward end. The side edges of the deck plate include inwardly opening channels receiving outwardly projecting flanges on the pedestal, to prevent movement of the pedestal upwardly off of the deck plate.

DESCRIPTION OF THE PREFERRED EMBODIMENT

Figure 1:
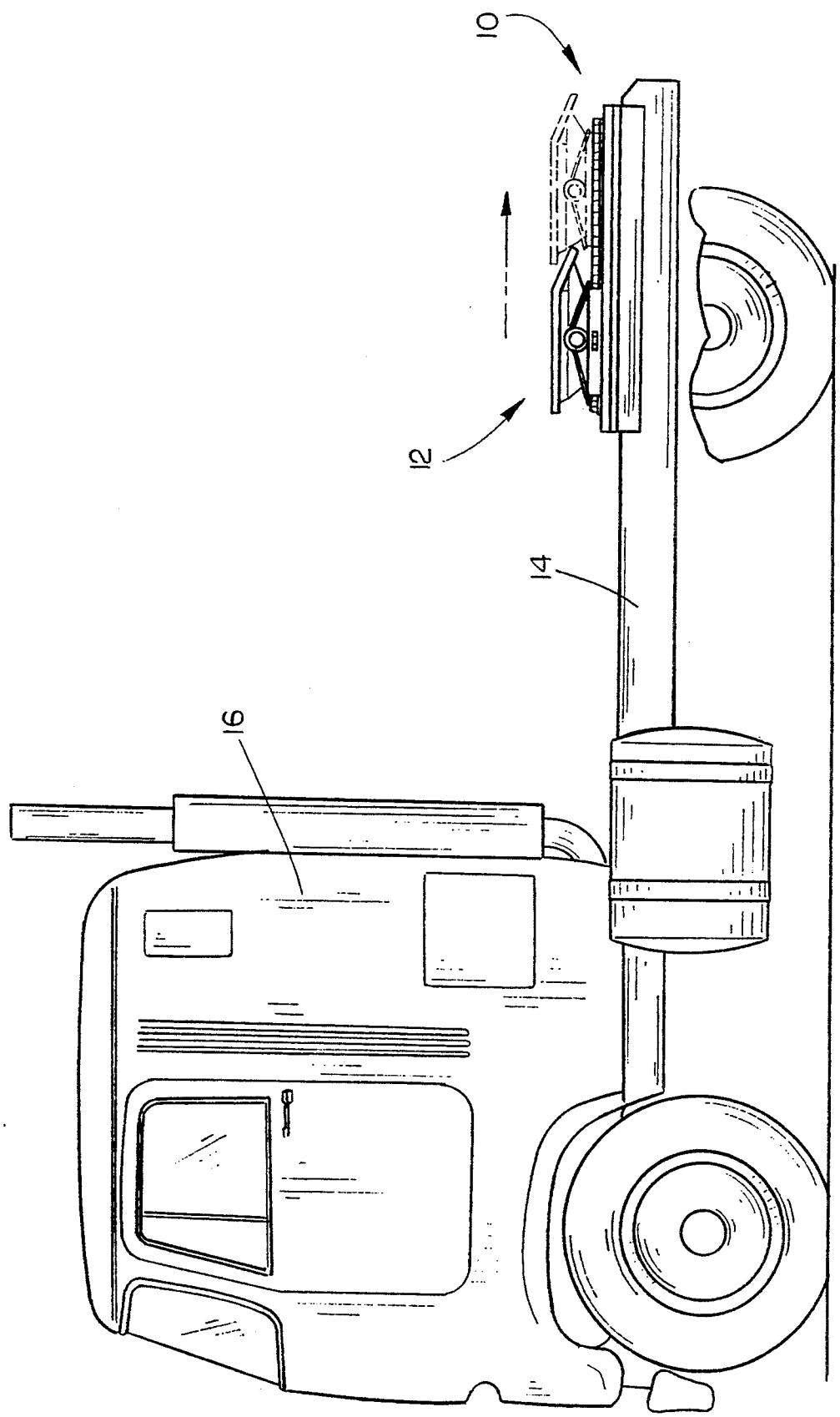
FIG. 1 is a side elevational view of a conventional semi-tractor with the fifth wheel and slide assembly of the present invention installed thereon.

Referring now to the drawings, in which similar or corresponding parts are identified with the same reference numeral, and more particularly to FIG. 1, the slide assembly of the present invention is designated generally at 10 and operably interconnects a fifth wheel 12 with the frame 14 of a conventional tractor 16.

Figure 2:
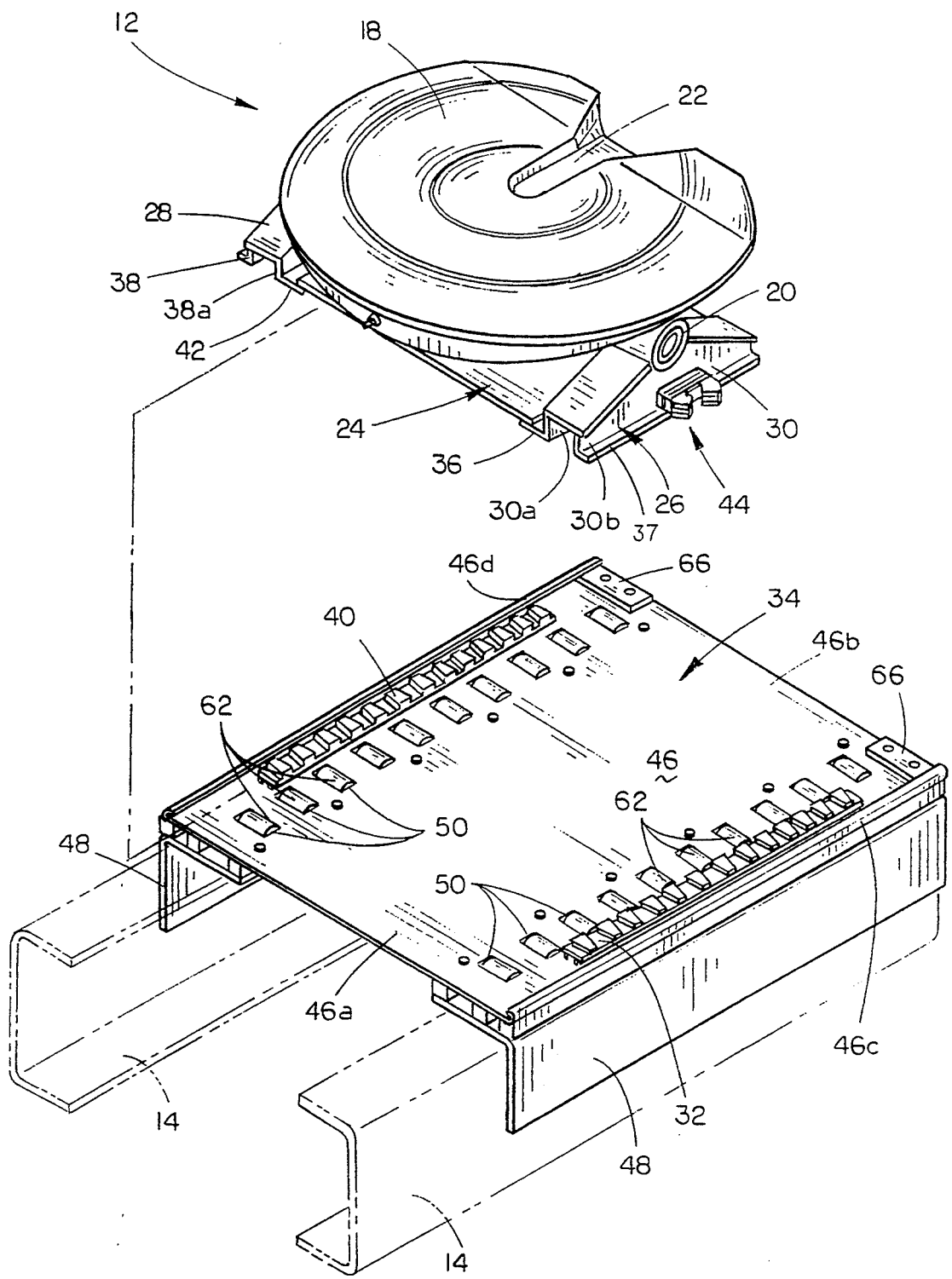
FIG. 2 is an exploded perspective view of the slide assembly of the present invention with the fifth wheel pedestal and hitch plate exploded therefrom.

Referring now to FIG. 2, fifth wheel 12 includes a conventional hitch plate 18 pivotally mounted on coaxially collars 20. Hitch plate 18 includes a conventional slot 22 for receiving the pin at the forward end of a trailer. Fifth wheel 12 includes a pedestal 24 with opposed and parallel generally upright support members 26 and 28, with collars 20 mounted at the upper end for pivotally supporting hitch plate 18.

Support member 26 includes an inverted channel 30 which is oriented to receive a toothed rail 32 on deck 34, as described in more detail hereinbelow. A flat support plate 36 extends horizontally from the inward leg 30a of channel 30, and extends along the length thereof. A flange 37 extends horizontally outwardly from the outward leg 30b of channel 30.

Support member 28 also includes an inverted channel 38 for receiving a second toothed rail 40 on deck 34. A flat support plate 42 extends along the inner leg 38a, and is oriented generally horizontally, coplanar with flat support plate 36. A flange 43 extends horizontally outwardly from outward leg 38b of channel 38.

A conventional operable lock mechanism is designated generally at 44 and extends through inverted channels 30 and 38 with apparatus for gripping the teeth of toothed rails 32 and 40 in a conventional fashion. Lock 44 permits selective positioning of fifth wheel 12 along toothed rails 32 and 40.

Deck 34 supports fifth wheel 12, and permits forward and rearward movement therealong. Deck 34 includes a deck plate 46 having forward and rearward ends 46a and 46b respectively, and opposing side edges 46c and 46d. Deck plate 46 is mounted to a pair of opposing angles 48 which are mounted to the tractor frame 14 (shown in broken lines) in a conventional manner.

Figures 3, 4:
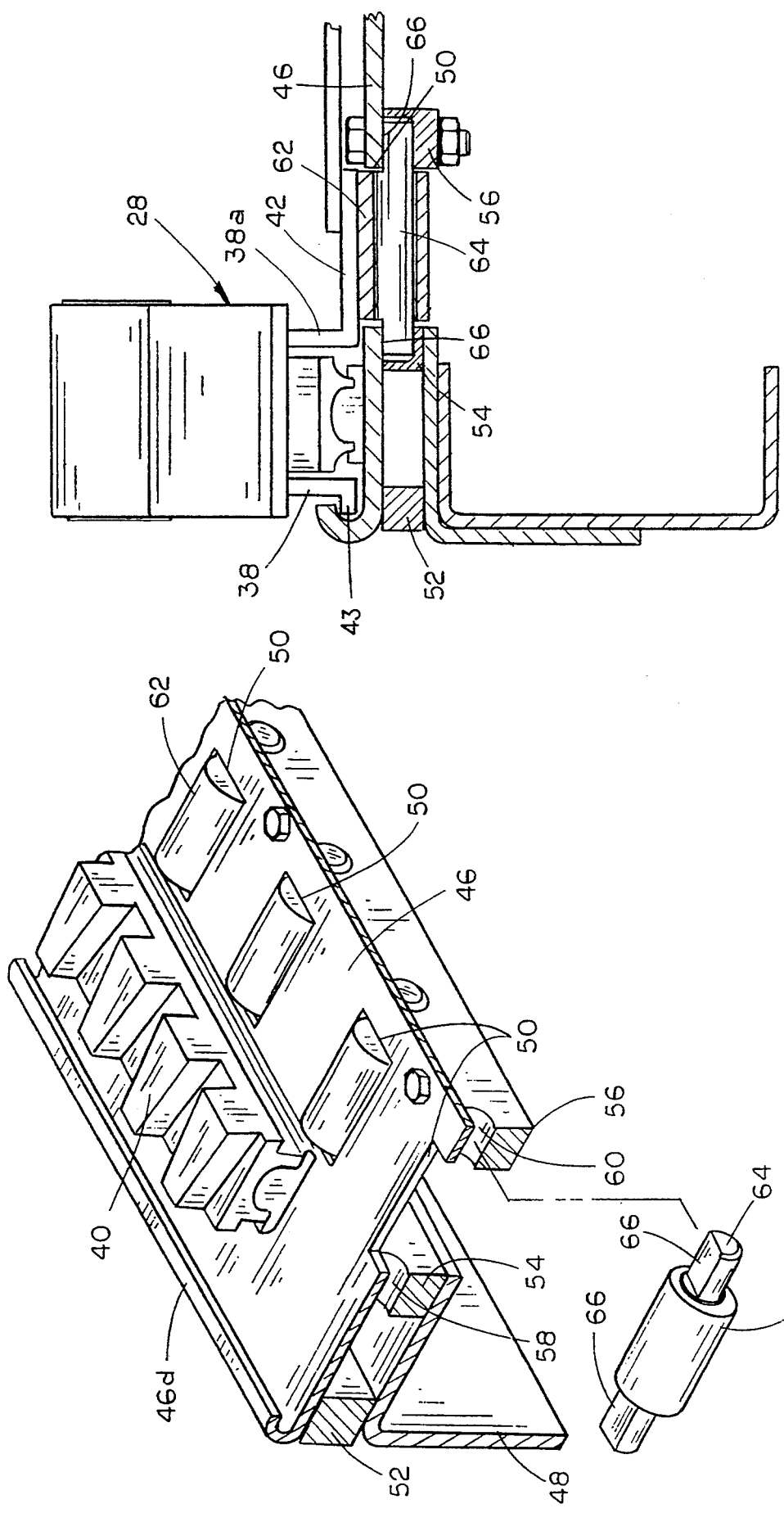
FIG. 3 is an enlarged perspective sectional view through a portion of the deck plate with a bearing exploded therefrom.
FIG. 4 is an elevational view of the section taken from the left end of FIG. 3.

Referring now to FIGS. 3 and 4, an enlarged sectional view is shown of a portion of the deck plate 46 and one toothed rail 40. Toothed rail 40 is mounted to the upper surface of deck plate 46 parallel and adjacent side edge 46d. A plurality of generally rectangular apertures 50 are formed through deck plate 46 and aligned from forward end 46a to rearward end 46b. Three elongated bars 52, 54 and 56 are mounted to the underside of deck plate 46, and are spaced apart and parallel to one another adjacent one side 46d of deck plate 46. The outer most bar 52 is mounted along edge 46d of deck plate 46 and supports deck plate 46 on angle 48. Bars 54 and 56 are oriented along opposing ends of apertures 50 and extend from the forward to the rearward end of deck plate 46. Bars 54 and 56 have a plurality of transverse grooves 58 and 60, respectively, aligned with each aperture 50 for supporting a bearing therein as described in more detail hereinbelow.

A plurality of rollers 62 are rotatably mounted on pins 64, which project from both ends of the rollers. The ends of pins 64 have a flattened upper surface which fits under deck plate 46 with pins 64 resting in grooves 58 and 60 in bars 54 and 56. Flat surfaces 66 on pins 64 serve to retain the pins from rotating, such that only rollers 62 rotate on the bearing pins 64. Rollers 62 have a diameter great enough to extend upwardly through apertures 50 in deck plate 46 when pins 64 are mounted in their associated grooves 58 and 60.

As shown in FIG. 2, apertures 50 are aligned interiorly of tooth rails 32 and 40 directly under flat support plates 36 and 42, and project upwardly through apertures 50. Thus, pedestal 24 is supported on rollers 62 by flat support plates 36 and 42, and will move freely forwardly and rearwardly when lock 44 is released. A pair of stops 66 are mounted on the rearward end 46b of deck plate 46 to prevent pedestal 24 from moving beyond the end of deck plate 46.

FIGS. 2 and 4 show that flat support plate 42 rides on the top surfaces of rollers 62, which project through openings 50 and deck plate 46. This rolling action permits easy movement of the fifth wheel along deck plate 46. Side edges 46c and 46d are curved upwardly and inwardly to form channels for receiving flanges 37 and 43 respectively on channels 30 and 38. In this way pedestal 24 is prevented from being raised off of rollers 62, and may only be removed by sliding and forwardly off the forward end 46a of deck plate 46.

Whereas the invention has been shown and described in connection with the preferred embodiment thereof, it will be understood that many modifications, substitutions and additions may be made which are within the intended broad scope of the appended claims. There has therefore been shown and described an improved fifth wheel slide assembly which accomplishes at least all of the above stated objects.

I claim:

1. In combination:
 a tractor having a frame for supporting a fifth wheel;
 a generally planar deck plate mounted on said frame and having forward and rearward ends, opposing sides, an upper surface and a lower surface;
 a first toothed rail mounted on an upper surface of the deck plate and extending generally parallel and adjacent one of said deck plate sides, for guiding a fifth wheel therealong;
 a second toothed rail mounted on the deck plate upper surface parallel to the first rail and extending generally parallel and adjacent the opposing deck plate side;
 a first plurality of apertures formed in said deck plate, aligned adjacent said first rail and extending generally from the forward end to the rearward end of the deck plate;
 a first plurality of rollers rotatably connected to said deck plate and projecting upwardly through said first plurality of apertures, said rollers having rotational axes parallel to one another and extending transversely to said first rail;
 a second plurality of apertures formed in said deck plate, aligned adjacent the second rail and extending from the forward end to the rearward end of the deck plate;
 a second plurality of rollers rotatably connected to said deck plate and projecting upwardly through said second plurality of apertures, said second plurality of rollers having rotation axes parallel and extending transversely to said rails;
 said first and second plurality of rollers being rotatably mounted to said deck plate with coplanar rotational axes located below the upper surface of the deck plate;
 said first and second plurality of rollers each having a length and diameter and being located such that the length and diameter substantially fills each said aperture;
 each said roller including a pin rotatably mounted therethrough along the rotational axis thereof, each said pin having a first end projecting outwardly from a first end of each roller and a second end projecting outwardly from a second end of each roller, said pin projecting ends mounted to said deck plate with a portion of the rollers projecting through said apertures;
 first pair of elongated bars mounted to the lower surface of the deck plate on opposing sides of said first plurality of apertures and oriented perpendicular to the axes of said first plurality of rollers;
 said first pair of bars having notches along upper edges thereof supporting said projecting ends of said pins extending through said first plurality of rollers;
 a second pair of elongated bars mounted to the lower surface of the deck plate on opposing sides of said second plurality of apertures and oriented perpendicular to the axes of said second plurality of rollers;
 said second pair of bars having notches along upper edges thereof supporting said projecting ends of said pins extending through said second plurality of rollers;
 a pedestal supporting a hitch plate, for receiving a depending pin from a trailer, operably mounted on said deck plate for movement forward and rearward along said rails;
 said pedestal including a pair of opposing and parallel support members for slidably receiving said rails; and
 said support members including first and second support plates located to rests on top of said first and second plurality of rollers, respectively, for supporting said pedestal on said deck plate.

2. The combination of claim 1, wherein each of said projecting ends of said pins has a flattened upper surface in contact with the deck plate lower surface, preventing rotation of said pins.

* * * * *